United States Patent [19]

Wacker et al.

[11] 4,075,934
[45] Feb. 28, 1978

[54] PISTON FOR INTERNAL COMBUSTION ENGINES

[75] Inventors: Erich Wacker, Heilbronn; Heinz Hofmann, Obereisesheim; Karl Kopp, Untereisesheim; Hermann Bauer, Neckarsulm; Volker von Ey, Neckarsulm; Franz Weiss, Neckarsulm, all of Germany

[73] Assignee: Karl Schmidt GmbH, Neckarsulm, Germany

[21] Appl. No.: 645,129

[22] Filed: Dec. 29, 1975

[51] Int. Cl.² ............................. F16J 1/02; F16J 1/08
[52] U.S. Cl. ........................................ 92/159; 92/158; 92/223
[58] Field of Search ................. 92/159, 158, 223, 224; 204/25

[56] References Cited

U.S. PATENT DOCUMENTS

| 1,302,231 | 4/1919 | Shehady | 92/158 X |
| 1,386,766 | 8/1921 | Centervall | 92/223 |
| 1,464,612 | 8/1923 | Madler | 92/158 |
| 1,717,750 | 6/1929 | Wills | 92/223 |
| 1,854,271 | 4/1932 | Michel | 92/224 |
| 2,410,405 | 11/1946 | Cornelius | 92/223 X |

FOREIGN PATENT DOCUMENTS

| 1,521,939 | 10/1973 | Germany. | |
| 2,063,651 | 7/1973 | Germany. | |
| 349,248 | 5/1931 | United Kingdom | 92/158 |

OTHER PUBLICATIONS

Forschungsberichte.

*Primary Examiner*—Irwin C. Cohen
*Attorney, Agent, or Firm*—Burgess, Dinklage & Sprung

[57] ABSTRACT

A piston for internal combustion engines, preferably made from aluminum alloy, has machined, oil-dragging grooves formed on the periphery of the piston skirt and concave transitions with a sawtoothlike profile with an obtuse profile angle. The piston skirt is provided with an electrodeposited hard iron layer having a thickness of 1–30 μm and contains 0.5–6% metal-oxy compounds incorporated therein.

5 Claims, 2 Drawing Figures

PISTON FOR INTERNAL COMBUSTION ENGINES

BACKGROUND

This invention relates to a piston for internal combustion engines, preferably of an aluminum alloy, comprising machined, oil-dragging grooves formed on the periphery of the piston skirt and having concave transitions and a sawtoothlike profile with an obtuse profile angle.

During the power stroke of a piston of an internal combustion engine, a minute amount of combustion gas leaks at least past the upper compression rings. Because in the following cycle the compression rings again contact the hot top portion of the cylinder, in which the combustion has taken place, the lubrication of the upper compression rings is a complicated problem.

On the other hand, the rings on the piston should prevent an ingress of lubricant into the combustion chamber. However, the amount of lubricant which is available for the uppermost compression ring should be so large that the latter is sufficiently lubricated in spite of the high operating temperature. The lubication will be sufficient if the uppermost ring has neither burnt spots nor minute marks due to seizing and its wear is minimized, just as the wear of the cylinder and piston. A sufficient lubrication adjacent to the rings depends mainly on the formation and adherence of a hydrodynamic lubricant film between the piston skirt and the working surface of the cylinder even when there is only a scant supply of lubricant.

To enable the formation of a hydrodynamic lubricant film between the pitson skirt and the working surface of the cylinder, it has been usual for some years to provide particularly the piston skirt with a machined surface having a certain minimum roughness in a depth which is in most cases not less than 2–6 $\mu$m, depending on the type of engine. Such a rough surface promotes the motion of the piston because the lubricant stored in the depressions of the surface forms a lubricating film and the rough surface also limits the wear between the piston skirt and the working surface of the cylinder.

To this end, it has been disclosed, e.g., in German Patent Application Sch No. 5976 Ia/46c[1], to provide the piston skirt on its periphery with machined oil-retaining grooves, which have a semicircular or arcuate profile. As the piston is run in, the height of the profile decreases rapidly at first owing to the relatively high wear. Whereas this wear is limited as the contacting part of the profile increases, the susceptibility of the piston to seizing increases because the depth of roughness has decreased as a result of the wear so that only a relatively small amount of lubricant is retained in the oil-retaining grooves. As a result, the formation of a hydrodynamic lubricating film throughout the periphery of the piston skirt is not always ensured during the upward and downward movements of the piston.

In a two-stroke cycle engine, it is difficult to retain the relatively small amount of lubricant, which is obtained from the fuel mixture, between the piston skirt and the working surface of the cylinder and to raise said lubricant into the ring-carrying portion of the piston so that a hydrodynamic lubricant film can form on the periphery of the piston skirt.

German Patent No. 2,063,651 discloses oil-retaining grooves which are provided on the periphery of the piston skirt and have different side face angles and transition radii increasing toward infinity. The profile angle of the oil-retaining grooves is 100°–170°, their smaller side face angle 0.5°–10° and their depth 1–20 $\mu$m. During the operation of the internal combustion engine, a lubricant film of uniform thickness is formed between such piston and the working surface of the cylinder so that the hydrodynamic pressures of the lubricating film on the pressure and back-pressure sides are always balanced and ingress of excessive lubricant into the combustion chamber is precluded.

It has been found, however, that in internal combustion engines to be subjected to high thermal stresses, particularly in two-stroke cycle engines, the contacting surface area of the sawtooth-shaped profile of the above-mentioned iron layer is changed to such a large extent by the wear caused by the operation of the engine that the depth of the oil grooves is appreciably reduced so that lubricant in the amount required for the formation of a lubricant film of uniform thickness on the periphery of the piston is no longer stored in the oil-retaining grooves when the piston has been run in.

SUMMARY

This problem has been solved in accordance with the invention in that the skirt of the piston has an electrodedeposited hard layer, which has a thickness of 1–30 $\mu$m, preferably 10–30 $\mu$m, and which contains 0.5–6%, preferably 2–5%, of an incorporated, non-metallic, foreign substance. The thickness of the hard iron layer depends mainly on the expected load on the piston. The foreign substances are metal-oxy compounds, preferably of oxychlorides, and increase the hardness of the iron layer to 600-800 HV.

DESCRIPTION

Figure 1:
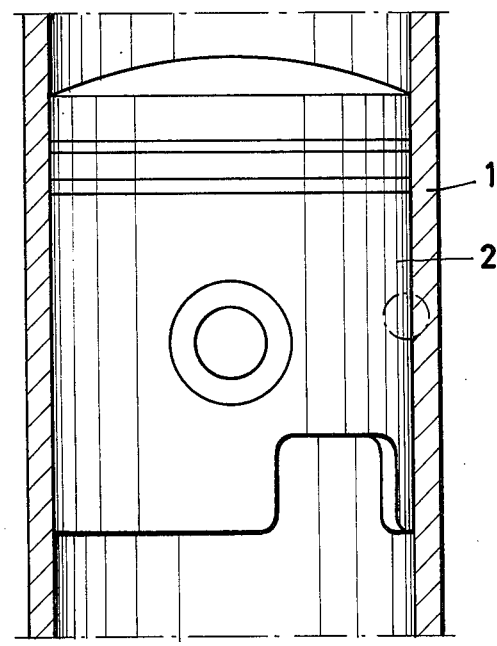
FIG. 1 is a side view, partly in cross-section, showing a piston and cylinder constructed according to the invention.

There have been numerous attempts to adopt the same measures also with pistons with simicircular or arcuate oil-retaining grooves provided on the periphery of the skirt. It has been found, however, that the fact that the contacting surface is relatively small gives rise to relatively high pressures, which result in a scoring and seizing of the working surface of the unreinforced aluminum cylinder and in a very high wear of the working surface of the cylinder as the engine is run in.

For this reason it is highly surprising that the problem can be solved by the combination of an electrodeposited hard iron layer which contains incorporated metal-oxy compounds, preferably oxychlorides, and a piston formed on the periphery of the piston skirt with oil-retaining grooves which have a sawtooth-shaped profile having an obtuse profile angle.

During a field trial of 500 hours, a hard iron layer provided in accordance with the invention on a piston skirt exhibited a relatively small wear of 5–10 $\mu$m. In contrast thereto, a hard iron layer having a hardness of 450 HV and provided on a piston exhibited a wear of 15–30 $\mu$m. The piston provided with a hard iron layer according to the invention has very good sliding properties and has proved to have an extremely high resistance to seizing.

From the Forschungsbericht des Wirtschafts- und Verkehrsministeriums NRW No. 56, 1952, pp. 23-32, it is known to form hard iron deposits with incorporated foreign substances on aluminum alloys. On the other hand, the investigations carried out have shown only that the hard iron deposits which contain oxides as incorporated foreign substances have a hardness which is similar to that of hard chromium. Whereas such hard iron deposits have a high resistance to impact and shock and a high bond strength, these properties do not permit of a conclusion regarding the technological behavior of the hard iron deposits provided on light metal pistons in aluminum cylinders having an unreinforced working surface because incorporated oxides result in a comparatively high wear of the working surface of the cylinder. For this reason the hardness does not furnish an indication of the wearing and sliding properties because the hard iron deposits which contain incorporated metal-oxy compounds have not only a hardness which is similar to that of hard iron deposits which contain oxides but apparently have also other characteristics which predominate over the influence of hardness and result in optimum sliding and wearing properties.

The invention is shown by way of example on the drawing and will be explained more fully hereinafter.

Figure 2:
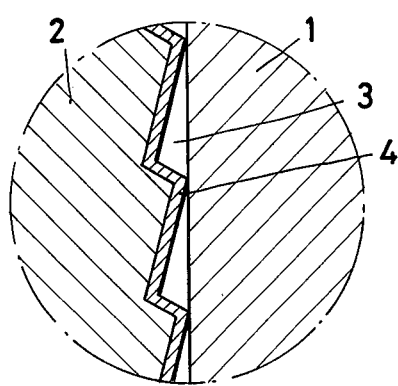
FIG. 2 is an enlarged fragmentary view in cross-section of a portion of FIG. 1 showing the configeration of the piston skirt according to the invention.

Fig. 1 shows a cylinder 1 which consists of an aluminum alloy AlSi17Cu4 and has an unreinforced working surface, and a cast piston 2, which consists of the alloy AlSi12CuNiMg and is contained in said cylinder. As is apparent from the enlarged fragmentary view in FIG. 2, the skirt of said piston is provided with oil-retaining grooves 3, which have a sawtoothlike profile, which is coated with a hard iron layer 4, which contains 3% particulate foreign material, in accordance with the invention.

Statements about the composition of the hard iron layer are only possible in a qualitative forms. The metal oxy compounds incorporated in the hard iron layer are consisting of iron hydroxide and oxy-chlorides of iron and aluminum under inclusion of atomic hydrogen.

What is claimed is:

1. In combination: a piston having a piston skirt and an aluminum cylinder having a nonreinforced working surface for use in an internal combustion engine, said piston skirt having a profile in the form of vertically running saw teeth to define oil-dragging grooves on the periphery of said piston skirt, the saw tooth profile including a first side and a second side joined to one another to define a protruding tooth, said piston skirt having thereon an electrodeposited hard iron layer defining a saw tooth profile, said iron layer having a thickness of 1-30 $\mu$m and containing 0.5-6% by weight of a metal-oxy compound incorporated therein.

2. Piston of claim 1 wherein the hard iron layer has a thickness of 10-30 $\mu$m.

3. Piston of claim 1 wherein the content of the incorporated metal-oxy compounds is 2-5%.

4. Piston of claim 1 wherein the metal-oxy compounds are oxy-chlorides.

5. A piston according to claim 1 wherein said first side is longer than said second side, the angle at which said first side joins said second side to define said tooth is 100°-170°, the angle formed by a line joining the tips of protruding teeth and said first side is 0.5°-10° and said grooves have a depth of 1-20 $\mu$m.

* * * * *